E. NEWMAN.
HITCH.
APPLICATION FILED MAR. 7, 1921.

1,417,344.

Patented May 23, 1922.
3 SHEETS—SHEET 1.

WITNESS:
George L. Ljunglof.

Emil Newman.
INVENTOR
BY Victor J. Evans
ATTORNEY

E. NEWMAN.
HITCH.
APPLICATION FILED MAR. 7, 1921.
1,417,344.
Patented May 23, 1922.
3 SHEETS—SHEET 2.
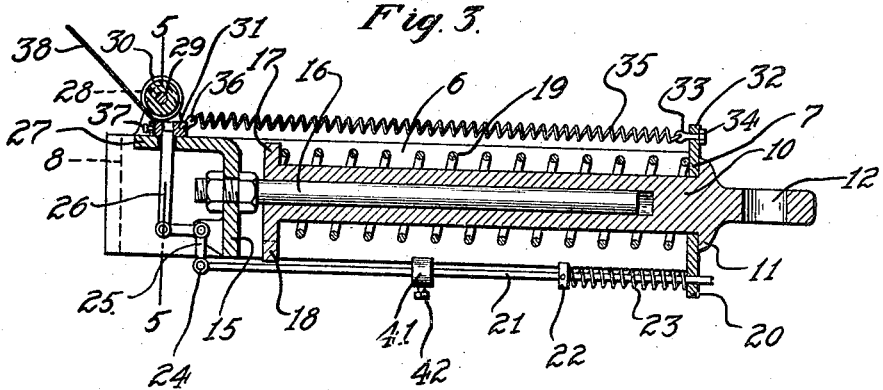
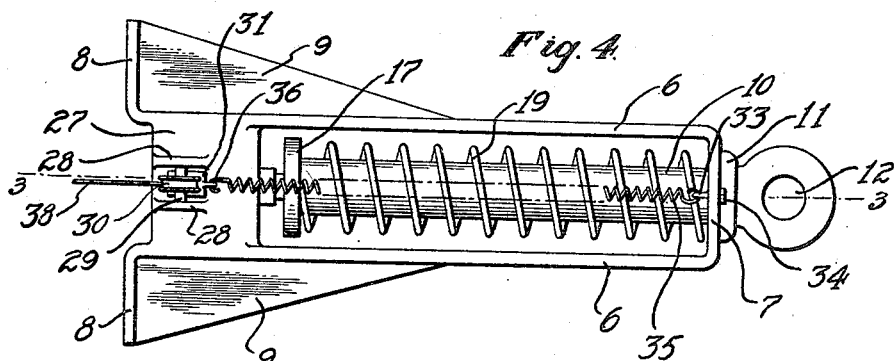
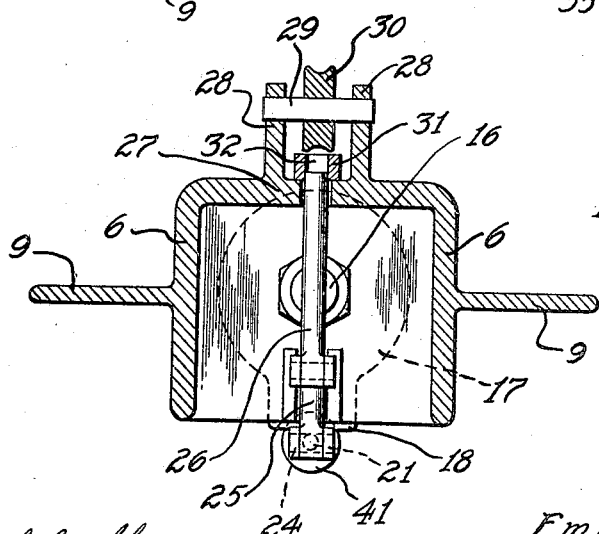
Emil Newman
INVENTOR
BY Victor J. Evans
ATTORNEY E. NEWMAN.
HITCH.
APPLICATION FILED MAR. 7, 1921.
1,417,344.
Patented May 23, 1922.
3 SHEETS—SHEET 3.
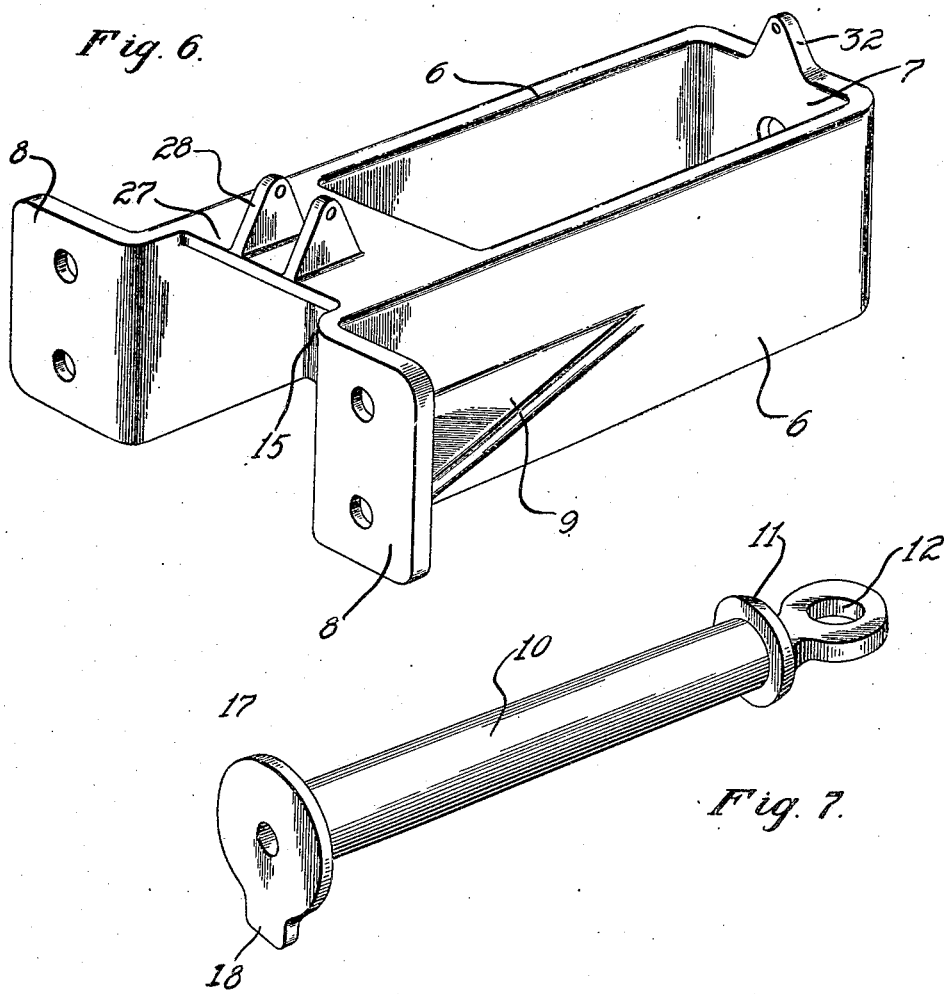
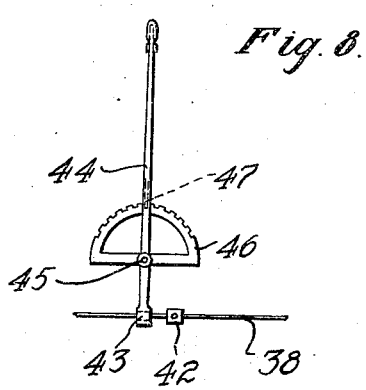
Emil Newman,
INVENTOR

UNITED STATES PATENT OFFICE.

EMIL NEWMAN, OF FESSENDEN, NORTH DAKOTA.

HITCH.

1,417,344. Specification of Letters Patent. Patented May 23, 1922.

Application filed March 7, 1921. Serial No. 450,456.

*To all whom it may concern:*

Be it known that I, EMIL NEWMAN, a citizen of the United States, residing at Fessenden, in the county of Wells and State of North Dakota, have invented new and useful Improvements in Hitches, of which the following is a specification.

My present invention has reference to a draw bar or hitch used for attaching a farm implement or the like to a tractor, and has for its object to produce a yieldable device of this character which has means associated therewith and connected to the clutch pedal of the tractor for operating the same and halting the tractor when the implement hitched thereto meets with an obstruction.

A further object is to produce a draw bar or hitch of this character which may be attached to any ordinary construction of tractors and connected to varying classes of farm or other wheeled devices and in which parts may be set whereby the clutch pedal of the tractor will be operated to stop the propulsion thereof when the implement attached to the tractor is obstructed by contact with an obstacle.

A further object is to produce a clutch operating hitch or draw bar for tractors which shall be of a simple construction, containing few parts which are not liable to disassociation or breakage, which has adjustable means for releasing the clutch when under the strain of varying force of pressures exerted thereagainst, and which is positive in action.

The foregoing, and other objects which will appear as the nature of the invention is better understood, may be accomplished by a construction, combination and operative association of parts, such as is disclosed by the drawings which accompany and which form part of this application.

In the drawings:—

Figure 3 is a sectional view on the line 3—3 of Figure 4.

Figure 4 is a top plan view of the improvement.

Figure 5 is a transverse sectional view on the line 5—5 of Figure 3.

Figure 6 is a perspective view of the frame.

Figure 7 is a similar view of the draw bar.

Figure 8 is fragmentary elevation of the hand operated means for resetting the hitch.

Figure 1:
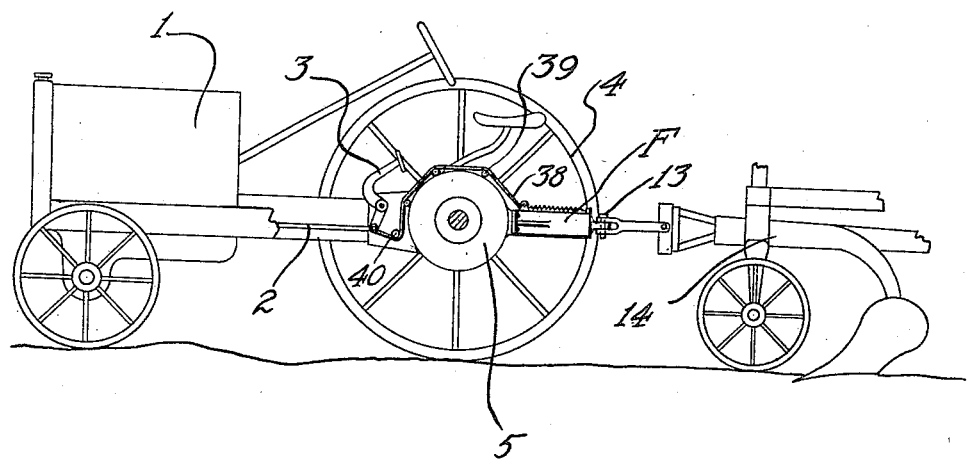
Figure 1 is an elevation of a tractor having an implement connected thereto by a draw bar or hitch which is constructed in accordance with this invention.
Figure 2:
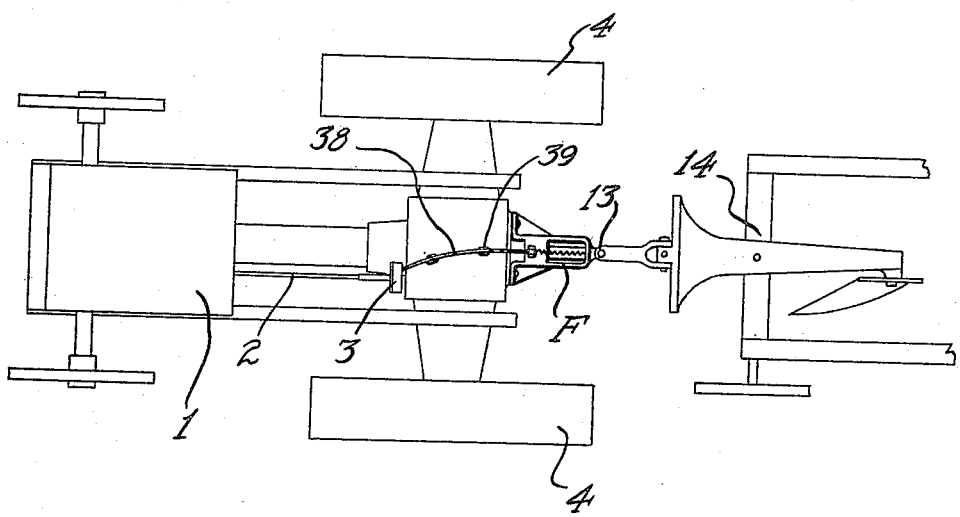
Figure 2 is a top plan view of the same.

Referring now to the drawings in detail, the numeral 1 designates a tractor of any desired type, 2 the clutch releasing rod, and 3 the clutch pedal. The motor shaft is disconnected from the axle for the drive wheels 4 upon depression of the clutch pedal 3, in the well known manner, and therefore details of this construction have not been illustrated.

To the rear of the differential housing for the drive axle of the tractor, there is secured a draw bar or hitch constructed in accordance with this invention. The hitch is broadly indicated by the letter F, and comprises a frame made up of parallel side members 6, connected at their outer ends, as at 7, and having their inner ends flanged outwardly, as at 8. These flanges are bolted or otherwise secured to the differential housing. Between the flanges 8 and the sides of the frame there are integral braces 9.

The closed outer end 7 of the hitch frame has a preferably rounded centrally arranged opening therethrough for the reception of a draw bar 10. The draw bar has its outer end widened, as at 11, and beyond the said widened portion is provided with an eye 12 for the reception of the clevis 13 of an implement 14 that is propelled by the tractor. The draw bar is preferably hollow from its inner to adjacent its outer end, or the end thereof provided with the eye. The numeral 15 designates a transverse plate arranged between and connected to the side members 6 of the hitch frame. This plate carries an outwardly extending centrally arranged guide bar 16 that is received in the bore of the draw bar 10, and whereby the draw bar is sustained in proper longitudinal relation to the frame of the hitch.

On its inner and open end the draw bar 10 is provided with a collar 17 which may be of a size to project a suitable distance through the open top and bottom of the hitch frame or which may have its lower edge provided with a depending portion in the nature of a finger 18.

Surrounding the draw bar, exerting a pressure between the collar 17 thereof and the closed outer end of the frame of the hitch, is a helical spring 19. The spring normally forces the draw bar inwardly of the hitch frame, causing the enlarged or headed portion 11 thereof to contact with the outer of the frame. The spring, of course, resists the outward movement of the draw bar through the frame, and thus provides a flexible connection between the implement and the tractor.

The outer end of the frame of the hitch F has a depending plate 20 provided with an opening in which there is arranged for slidable movement a rod 21. This rod has secured thereon a collar 22 which is contacted by one end of a spring 23 that surrounds the rod and that is also in contacting engagement with the plate 20. Thus the rod 21 is spring influenced in an inward direction on the frame of the hitch. The inner end of the rod has pivotally connected thereto, as at 24 an elbow lever 25 which is pivoted to the frame of the hitch. The free arm of the toggle lever has loosely connected therewith a rod 26.

On the top of the frame of the hitch, opposite the rod 26 there is a bracket member which constitutes a base 27 provided at its ends with upstanding ears 28. Thus the bracket is substantially U-shaped in elevation. The base of the bracket has an opening therethrough, and in this opening the end of the rod 26 is received. Between the side members or ears 28 of the bracket, adjacent to the outer end thereof there is journaled a shaft 29 for a grooved guide or pulley wheel 30.

Normally resting on the base 27 of the bracket is a block 31 that has an opening 32 therein in which the rod 26 is received, and whereby the block is normally retained against movement through the bracket, and tendency to outward movement of the said block being prevented by the arrangement of the guide pulley 30 thereover.

On the outer and closed face of the frame of the hitch, at the top thereof, there is a plate 32 provided with an opening through which passes an eye bolt 33 that is engaged by a nut 34. The eye end of the bolt has secured thereto one end of a helical spring 35, the other end being connected, as at 36, to the block 31. To the opposite, or face of the block 31 there is secured, as at 37 a flexible element in the nature of a cord or light cable 38 that is trained over pulleys 39, on the rear of the tractor frame, and under a pulley 40 arranged directly below the clutch pedal 3. The flexible element 38 has its free end connected to the clutch pedal.

The finger 18 on the collar 17 of the draw bar 10 is in the nature of a striker element, and on the rod 21 there is adjustably secured a contact element or block 41.

The contact element is bound against the rod 21 by a screw or bolt 42, and therefore may be positioned at any desired point on the said rod. While in the drawings, I have illustrated the tractor hitched to a farming implement, such as a plow, it is to be understood that the hitch may be employed for connecting any other desired implement or vehicle to the tractor. We will suppose that the point of the plow 14 contacts with an obstacle which, were the plow not released from the tractor, or were the tractor not halted in its movement, would result in the breakage of the plow 14, injury to the hitch and perhaps injury to the tractor. In such instance, an outward pull will be exerted on the draw bar 10, moving the same so that the finger 18 thereof will be brought against the contact element 41 on the rod 21, influencing the rod against the pressure of its spring 23, causing the said rod to swing the bell crank lever which, influencing the rod 26, releases the block 31. This permits the spring 35 to contract, drawing on the flexible element 38 which will move the clutch pedal 3 to operate well known parts to release the engine shaft from direct influence on the shaft of the propelling wheels 4 of the tractor. The operator may then either remove the obstruction or move the implement 14 away from such obstruction, and by resetting the parts of the hitch, the tractor may proceed with the implement.

When the improvement is employed in connection with heavy tractors and implements, the resetting of the hitch cannot easily be accomplished by hand, and in such instances, I secure on the flexible element 38 a knob or enlargement 41'. The flexible element passes loosely through an opening in a boss 43 provided on a lever 44. The lever is pivoted, as at 45 to a segmental rack 46, and the said lever is provided with a lever actuated spring influenced pawl or dog 47 that engages with the teeth of the rack. It will be apparent that by swinging the lever so that the same is brought against the enlargement 41', the flexible element 38 will be drawn taut, and thus the block 31 may be brought into the bracket. Of course, the rod 21 is influenced against the pressure of its spring 23 to bring the rod or bolt portion 26 which is connected thereto by the bell crank lever below the inner face of the base portion 27 of the bracket, and such pressure is released when the block is properly positioned in the bracket.

It is, of course, to be understood that other means for retaining the flexible element 38 normally inactive may be employed, as any desired clutch means may be successfully used to engage with the said element without departing from the spirit of the invention. The outer portion or lead of the element 38 is at all times retained at an angle, and consequently the same will be received in the grooved guide or sheave wheel 30 when the clutch means is released, and it is thought that the foregoing description, when taken in connection with the drawings will fully set forth the construction and advantages of the improvement to those skilled in the art to which such inventions relate, and therefore further detailed description will not be attempted. It is, of course, understood that the construction does not interfere with the proper operation of the clutch pedal, and other mechanisms associated with the tractor, by the operator of said tractor.

Having described the invention, I claim:—

1. In combination with a tractor having a clutch pedal for disassociating the engine shaft from the drive wheels of the tractor; of a hitch, including an open frame secured to the tractor, brace means between said frame and tractor, a spring influenced draw bar movable through the frame, a spring influenced flexible element between the hitch and the clutch pedal for operating the latter, spring influenced clutch means carried by the hitch frame and engaging with said flexible means for holding the latter in non-clutch operating position, a contact element included in said clutch means, and a striker element on the draw bar designed for engagement with the striker element for influencing the clutch means to release the flexible clutch pedal operating means when the draw bar has been drawn a predetermined distance outwardly through the hitch frame.

2. In combination with a tractor having a clutch pedal for disassociating the engine shaft from the drive wheels of the tractor, of a hitch, comprising an open frame which is secured to the tractor, brace means between the frame and tractor, a spring influenced draw bar movable in the hitch frame, guide means therefor, spring influenced flexible means between the hitch frame and the pedal lever for actuating the latter, clutch means carried by the hitch frame for engaging the flexible means to hold the latter in non-clutch operating position, and means actuated by the draw bar when the latter is drawn a predetermined distance outward from the hitch frame for actuating the clutch means to release the flexible clutch pedal operating means.

3. In combination with a tractor having a clutch pedal for disassociating the engine shaft from the drive wheels of the tractor; of a hitch including an open frame which is secured to the tractor, brace means between the frame and tractor, a hollow draw bar movable in the frame, a guide rod supported by the frame and entering the hollow draw bar, spring means between the frame and draw bar for retaining the latter normally in one position with respect to the former, a bracket on the hitch frame, a pulley journaled therein, a block below the pulley, adjustable spring means between the block and hitch frame, a flexible element secured to the block and connected with the clutch pedal for operating the latter, a bolt passing through the bracket, for engaging with the block for holding the same thereon and holding the flexible element from influencing the clutch pedal, a toggle lever connected to the bolt, a rod on the second arm of the toggle lever guided in the hitch frame, spring means between the frame and rod for holding the latter in one position and the bolt in engagement with the block, an adjustable contact member on the rod, and a finger on the draw bar designed to engage said contact member, when the draw bar is moved a predetermined distance outward of the hitch frame, for releasing the bolt and permitting the spring influenced flexible element to operate the clutch pedal.

In testimony whereof I affix my signature.

EMIL NEWMAN.